United States Patent
Ishaaya et al.

(10) Patent No.: US 12,278,456 B2
(45) Date of Patent: Apr. 15, 2025

(54) SUPER-MODE SELECTIVE OPTICAL UNIT

(71) Applicant: B.G. Negev Technologies and Applications Ltd., Beer Sheva (IL)

(72) Inventors: Amiel Ishaaya, Ness Ziona (IL); Yakov Greenberg, Beer Sheva (IL)

(73) Assignee: B.G. NEGEV TECHNOLOGIES AND APPLICATIONS LTD., Beer Sheva (IL)

( * ) Notice: Subject to any disclaimer, the term of this patent is extended or adjusted under 35 U.S.C. 154(b) by 0 days.

(21) Appl. No.: 18/574,292

(22) PCT Filed: Jun. 22, 2022

(86) PCT No.: PCT/IB2022/055811
§ 371 (c)(1),
(2) Date: Dec. 26, 2023

(87) PCT Pub. No.: WO2022/269522
PCT Pub. Date: Dec. 29, 2022

(65) Prior Publication Data
US 2024/0266796 A1 Aug. 8, 2024

Related U.S. Application Data

(60) Provisional application No. 63/213,761, filed on Jun. 23, 2021.

(51) Int. Cl.
*G02B 6/02* (2006.01)
*H01S 3/067* (2006.01)

(52) U.S. Cl.
CPC ...... *H01S 3/06737* (2013.01); *G02B 6/02042* (2013.01); *H01S 3/06733* (2013.01)

(58) Field of Classification Search
CPC ... G02B 6/02042; G02B 6/3885; G02B 6/021
See application file for complete search history.

(56) References Cited

U.S. PATENT DOCUMENTS

| | | | |
|---|---|---|---|
| 5,930,435 A * | 7/1999 | Laming | G02F 1/3523 385/126 |
| 10,585,234 B2 * | 3/2020 | Hasegawa | G02B 6/2551 |
| 11,585,684 B2 * | 2/2023 | Li | G01K 11/32 |
| 2011/0274398 A1 | 11/2011 | Fini et al. | |
| 2014/0055843 A1 | 2/2014 | Roland et al. | |
| 2014/0307304 A1 | 10/2014 | Zhu | |
| 2016/0291246 A1 | 10/2016 | Shiozaki et al. | |
| 2017/0299806 A1 | 10/2017 | Kopp | |
| 2019/0025501 A1 | 1/2019 | Kopp | |
| 2020/0300614 A1 * | 9/2020 | Van Putten | G01B 11/18 |
| 2021/0242655 A1 * | 8/2021 | Ohtsuka | G02B 6/021 |

FOREIGN PATENT DOCUMENTS

WO 2012088361 A2 6/2012

* cited by examiner

*Primary Examiner* — Eric Wong
(74) *Attorney, Agent, or Firm* — Reches Patents

(57) ABSTRACT

A super-mode selective optical unit that may include (i) a multicore fiber (MCF) that comprises one or more claddings, and multiple doped fiber cores located within one of the one or more claddings; and (ii) a multimode fiber (MMF) that comprises a first MMF end and a second MMF end; wherein the first MMF end is configured to receive optical signals from the MCF; wherein the MMF is configured to attenuate in-phase super-mode components of the optical signals of the MCF and to amplify out-of-phase components of the optical signals.

17 Claims, 9 Drawing Sheets

41

42

43

44

Propagating optical signals within a multicore fiber (MCF) that includes one or more claddings, and multiple doped fiber cores located within one of the one or more claddings. The optical signals include in-phase super-mode components and out-of-phase super-mode components 510

Attenuating the out-of-phase super-mode components by providing the optical signals to a multimode fiber (MMF) that is directly coupled to the MCF. 520

SUPER-MODE SELECTIVE OPTICAL UNIT

CROSS REFERENCE

This application claims priority from U.S. provisional patent Ser. No. 63/213,761 filing date Jun. 23, 2021 which is incorporated herein in its entirety.

BACKGROUND OF THE INVENTION

Direct power scaling of a fiber laser is limited due to detrimental nonlinear effects, damage, and mode instabilities.

There is a growing need to provide a fiber laser that can convey significant power.

SUMMARY

There may be provided a super-mode selective optical unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 10 is an example of a method.

DETAILED DESCRIPTION OF THE DRAWINGS

Figure 1:
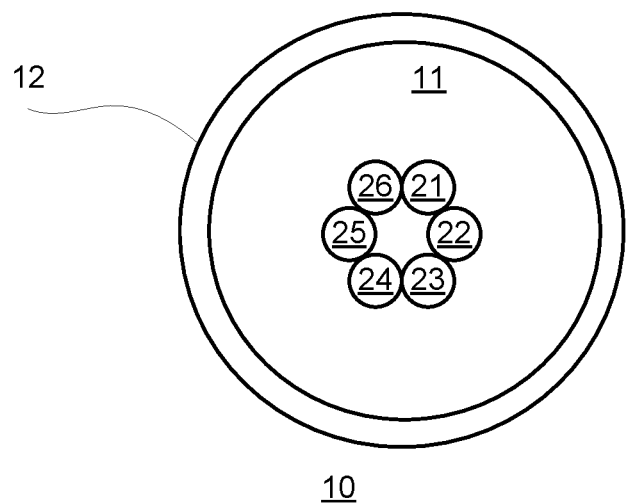
FIG. 1 illustrates an example of a cross section of a six core multicore fiber (MCF)

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using fibers and optics known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Active multicore fibers (MCFs), in which multiple doped cores are arranged into one fiber may be used for power scaling of fiber lasers.

The doped cores are doped with laser active elements such as rare earth ions such as Ytterbium, Erbium, and the like.

When the cores of an MCF are sufficiently coupled, light propagates as super-modes, thus the coherence between the multiple doped cores is automatically maintained along the fiber.

Nevertheless, due to the gain overlap and the inevitable mode competition in laser cavities, only the in-phase super-mode and the out-of-phase super-modes which have radially symmetric intensity profile will be excited within a laser cavity.

In-phase super-mode components of the optical signals are of the same phase. Out-of-phase—super-mode components of the optical signals are out of phase—there is a one hundred and eighty degree ($\pi$) phase difference between out-of-phase super-mode components of adjacent doped cores.

FIG. 1 illustrates a cross section of a six core multicore fiber (MCF) 10 that includes size doped cores 21-26 located within inner cladding 11 that is surrounded by outer cladding 12.

The refractive index of the cores exceeds the refractive index of the inner cladding that in turn exceeds the refractive index of the outer cladding.

Light signals propagate within the doped cores. A pump signal propagates within the inner cladding and interacts, with the active ions within the doped cores, transferring energy into the doped cores by means of a absorption in the active ions. This energy is then emitted as signal photons (stimulated emission) that propagate in the cores.

Figure 2:
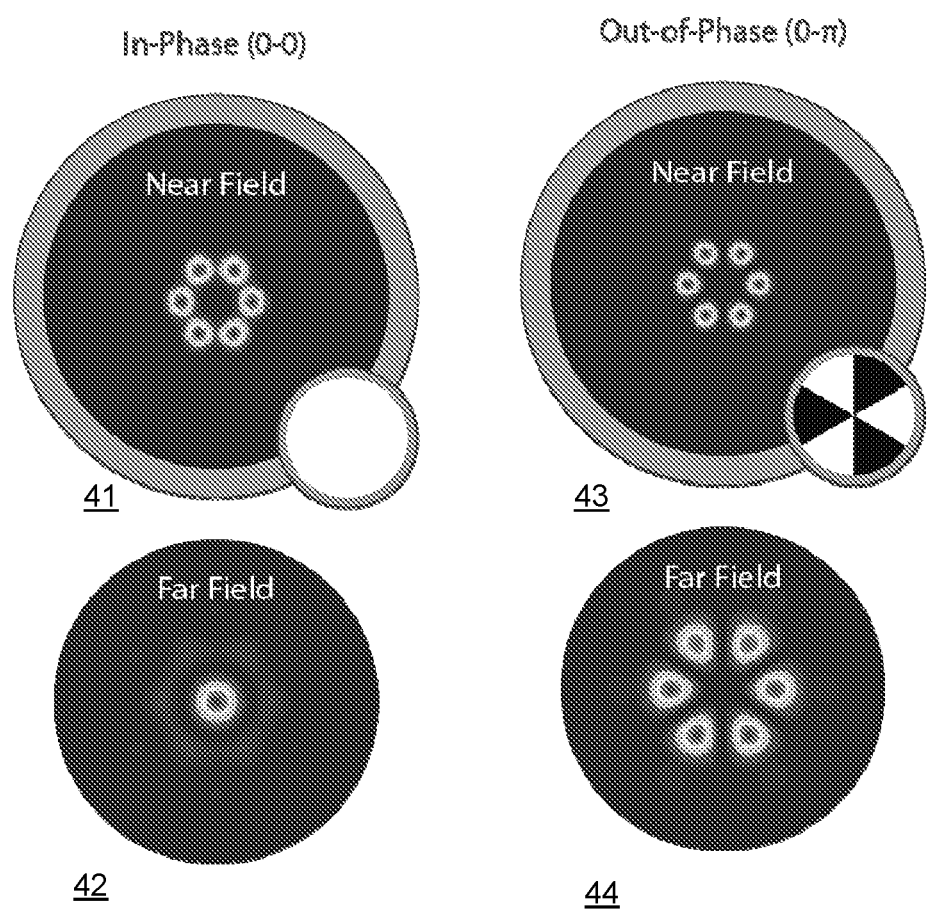
FIG. 2 illustrates examples of an in-phase spatial supermode and an out-of-phase spatial supermode (intensity and phase in both near- and far-field)

FIG. 2 illustrates (a) In-phase super-mode components 41 of the optical signals that are outputted (in near field location) from MCF 10, (b) In-phase super-mode components 42 of the optical signals at a far field from MCF 10, (c) out-of-phase super-mode components 43 of the optical signals that are outputted (in near field location) from MCF 10, and (d) out-of-phase super-mode components 44 of the optical signals at a far field from MCF 10.

It has been found that the out-of-phase super-mode is better than the in-phase super-mode due to its improved stability (in relation to the in-phase super-mode) at high powers, and slightly larger effective gain. In addition—in-phase super-mode is more susceptible to self-focusing.

The MCF when placed in a laser cavity will convey both in-phase super-mode components and out-of-phase super-mode components of optical signals—which deteriorates the output beam quality.

Figure 3:
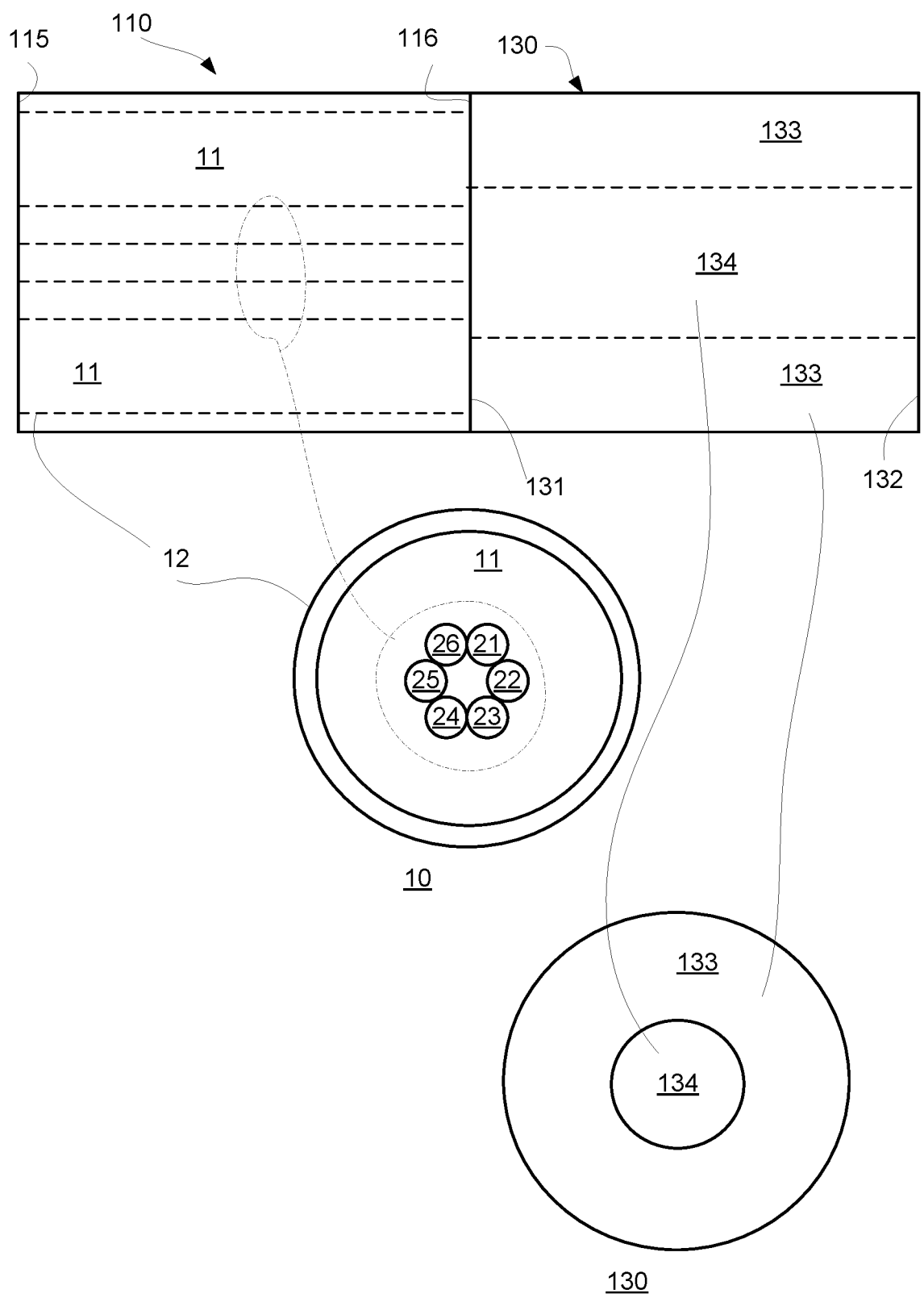
FIG. 3 illustrates an example of a super-mode selective optical unit.

FIG. 3 illustrates an example of a super-mode selective optical unit 100 that is configured to attenuate in-phase super-mode components of the optical signals of the MCF and to retain the out-of-phase components of the optical signals.

The super-mode selective optical unit 100 may include (a) a MCF 110 that includes one or more claddings (for example inner cladding 11 and outer cladding 12), and multiple doped fiber cores 21-26 located within one of the one or more claddings, first MCF end 115 and second MCF end 116, and (b) a multimode fiber (MMF) 130 that includes a first MMF end 131 and a second MMF end 132. The MMF 130 may include cladding 133 and core 134.

The MCF and the MMF may virtually form a single optic fiber—and can be viewed as a different parts of a single fiber.

The first MMF end is configured to receive optical signals from the MCF. The MMF is configured to attenuate in-phase super-mode components of the optical signals of the MCF and to retain out-of-phase components of the optical signals.

Depending on the spatial modes exiting the MCF, different spatial modes are excited in the MMF where they propagate and interfere with each other. The distribution of the output field from the MMF is determined by modal interference.

Figure 4:
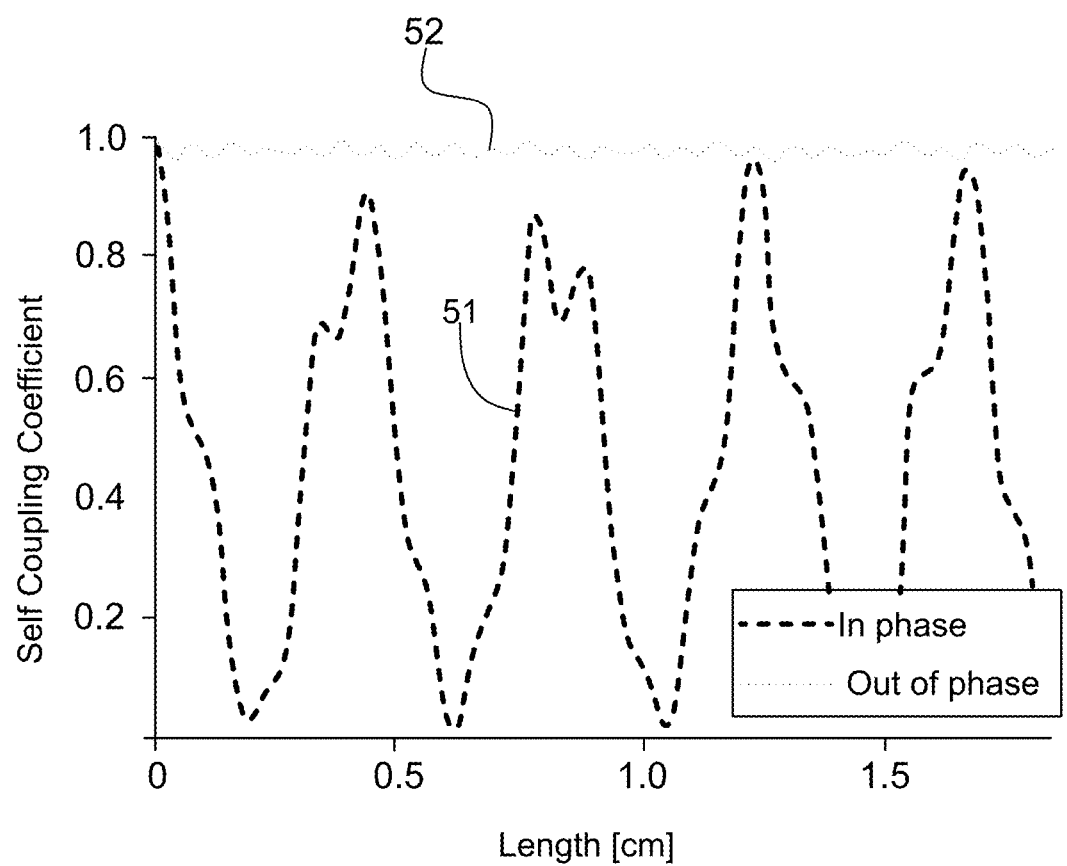
FIG. 4 illustrates examples of self-coupling coefficients of the in-phase and out-of-phase super-modes.

This effect is illustrated in FIG. 4, where the self-coupling coefficients (MCF-to MCF) of the in-phase and out-of-phase super-modes are plotted as a function of MMF length. The coupling coefficient for the out-of-phase mode remains independent by matching the field distribution to a single higher order spatial mode of the MMF, and preventing interference with other modes. The MMF length is then utilized to provide differential feedback during the cavity roundtrip to support or suppress oscillations of the desired super-mode.

As indicated above—the in-phase super-mode components may exhibit alternating constructive and destructive interferences, and the attenuation of the out-of-phase components of the optical signals may be obtained by adjusting the length of the MMF so that the second MMF end is in proximity to a location of a destructive interference of the in-phase super-mode components of the optical signals of the MCF. In proximity means—exactly at the peak of the destructive interference or at a distance that will result in an attenuation that is within a predefined value from the peak—for example up to 3 dB from the peak.

FIG. 4 illustrates an example of the alternating constructive and destructive interferences (graph 51) of the in-phase super-mode components within an MMF. FIG. 4 also illustrates that the out-of-phase components may exhibit minor intensity changes (graph 52).

Figure 5:
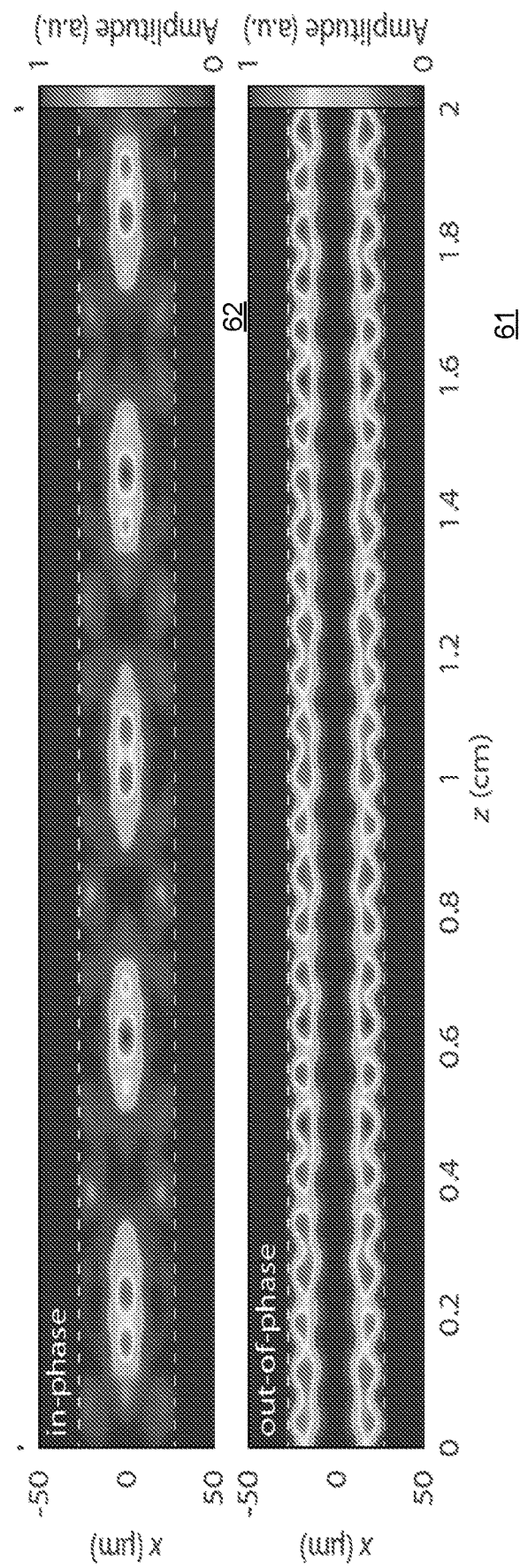
FIG. 5 illustrates examples of simulated intensity of the propagating fields along the MMF section in a central cross section.

The simulated intensity of the propagating fields along the MMF section in a central cross section plane are shown in FIG. 5. The periodic behavior of the coupling coefficient is clearly seen for the in-phase mode (simulation result 61), whereas the coupling coefficient of the out-of-phase field remains relatively stable along the propagation (simulation result 62).

In order to reduce energy losses and/or introduce significant noise—there may be no significant gap between the first MMF end and the MCF (such as an actual splice). The gap is insignificant when its introduced energy losses of less than a predefined value—for example less than 1%, 5%, 10% and the like. There may be no gap at all. When there is no significant gap then the first MCF end that may be regarded as directly connected to the first MMF end.

In order to reduce energy losses—each one of the multiple doped fiber cores has an end that is directly connected to the first MMF end.

There may be any even number of doped cores—for example—between six and twenty doped cores, The doped cores may be arranged in any shape that fits an out-of-phase super-mode solution of the fiber (the mentioned solution is for the wave propagation equation in the waveguide) —for example:

a. The multiple doped fiber cores may be arranged in a radially symmetric manner—for example in relation to a center of the.
b. The multiple doped fiber cores may be arranged in a radially asymmetric manner.
c. The multiple doped fiber cores may be arranged in a single annular region.
d. The multiple doped fiber cores may be arranged in multiple concentric annular regions.
e. The distance between adjacent doped fibers of the multiple doped fiber cores does not exceed a distance that will not allow coupling between the adjacent cores. There may be an optimal distance for each core radius—i.e. larger cores can tolerate larger core separation. However, larger cores means more modes. An example of a tradeoff include cores that are about 20 um. This provides single-mode (or few modes) to propagate while having the largest cores for maximal power and gain.

Figure 6:
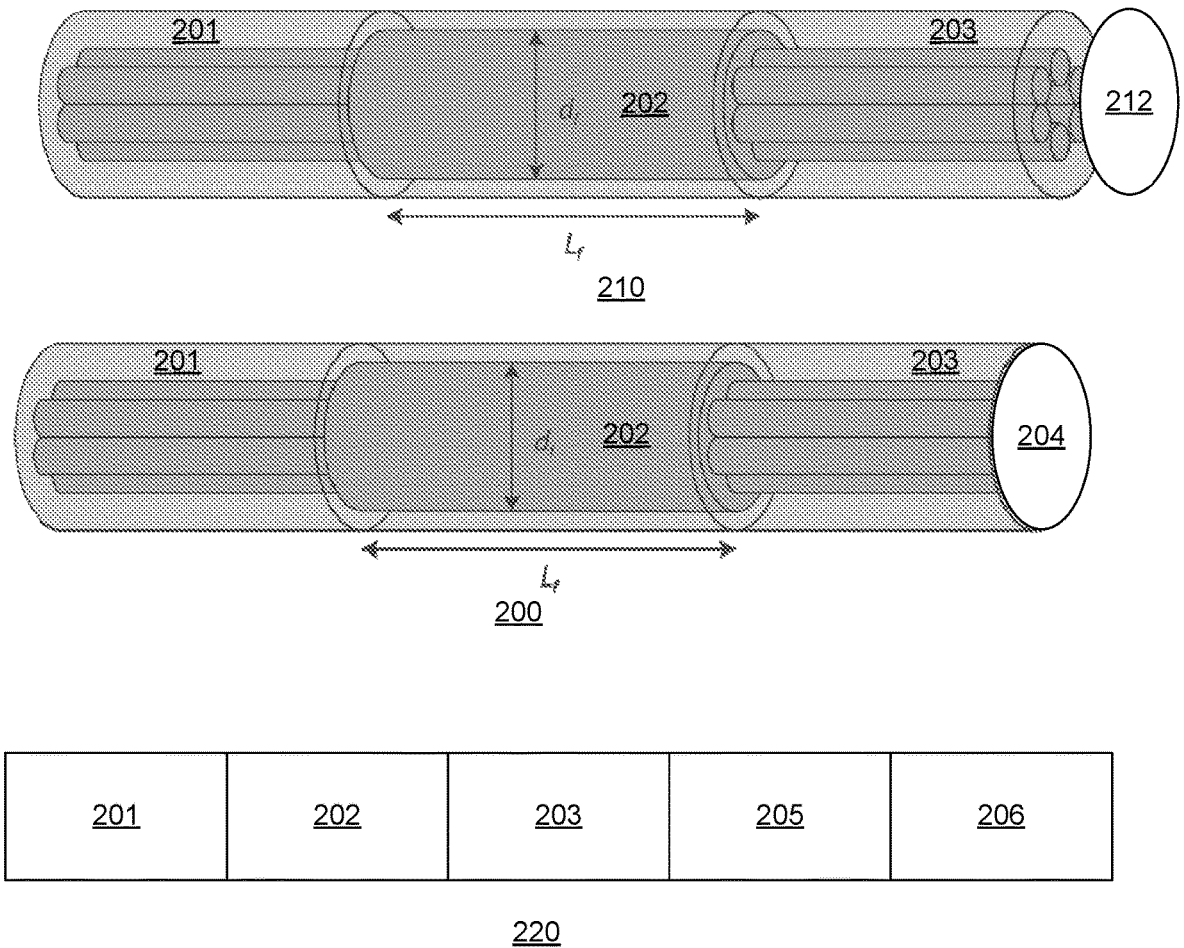
FIG. 6 illustrates examples of super-mode selective optical unit between two MCFs.

FIG. 6 illustrates a super-mode selective optical unit 210 and a high reflecting mirror 212. The super-mode selective optical unit 210 operates as a laser amplifier 210. When operating as a laser amplifier then the second MMF is an output of the MMF. The super-mode selective optical unit 210 may include a sequence of a first MCF 201, a MMF 202, and second MCF 203.

FIG. 6 also illustrates a super-mode selective optical unit 200 that operates as a laser oscillator.

The super-mode selective optical unit 200 may include a sequence of a first MCF 201, a MMF 202, a second MCF 203, and reflective mirror 204.

When operating as a laser oscillator then:
a. The second MMF end may be directly connected to reflecting mirror 204.
b. The reflecting mirror 204 may be formed at the second MMF.
c. The second MMF end may be directly connected to volume Bragg grating (VBG) (not shown).
d. A Fiber Bragg Grating (FBG) may be formed in the MMF.

It should be noted that the MMF can be placed anywhere inside the fiber and several sections of MMF can be implemented in order to improve the modal selectivity.

It should be noted that the super-mode selective optical unit may include multiple MCFs. It should also noted that the super-mode selective optical unit may include multiple MCFs and multiple MMFs. A MMF may follow an MCF. A MCF may follow an MMF.

FIG. 6 further illustrates a selective optical unit 220 may include a sequence of a first MCF 201, a first MMF 202, second MCF 203, second MMF 205 and third MCF 206.

The selective optical unit may also include a reflective mirror and act as a laser oscillator or may be without such reflective mirror and behave as a laser amplifier.

Figure 7:
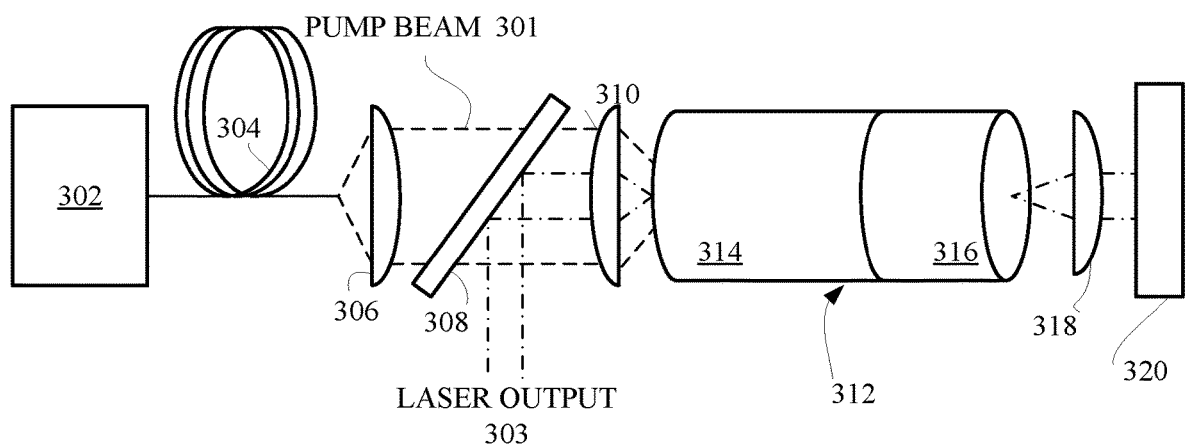
FIG. 7 illustrates an experimental setup.

FIG. 7 illustrates an experimental setup 300 that includes a laser diode pump 302, input fiber 304, first lens 306, dichroic mirror 308, second lens 310, and a laser oscillator that includes super-mode selective optical unit 312, a third lens 318 and a high reflection component 320 (Mirror/VBG). The super-mode selective optical unit 312 includes MCF 314 and MMF 316.

The diode pump 302 generates light at a wavelength of 976 nm to provide a multimode pump beam ("PUMP BEAM 301") that is free-space coupled into the inner cladding of the MCF through a beam splitter 308 such as a shortpass dichroic mirror (1000 nm cutoff wavelength).

The super-mode selective optical unit 312 includes an MCF having a double clad step index, all solid silica LMA with 6 highly doped Yb-doped cores arranged in an annular configuration. The MCF has an inner cladding diameter of 235 mm with NA of 0.45 coated with a low-index acrylate polymer. Each doped core has an 18 μm in diameter with NA of 0.068, and the core pitch is 2.5 μm.

A 14 millimeter long MMF was directly spliced to the MCF. The laser oscillator outputs a laser output beam 303. The laser oscillator of setup 300 includes a VBS 302 that is spaced apart from the MMF 316—and thus introduced losses and aberrations—but the setup was adequate for experimental purposes.

Figure 8:
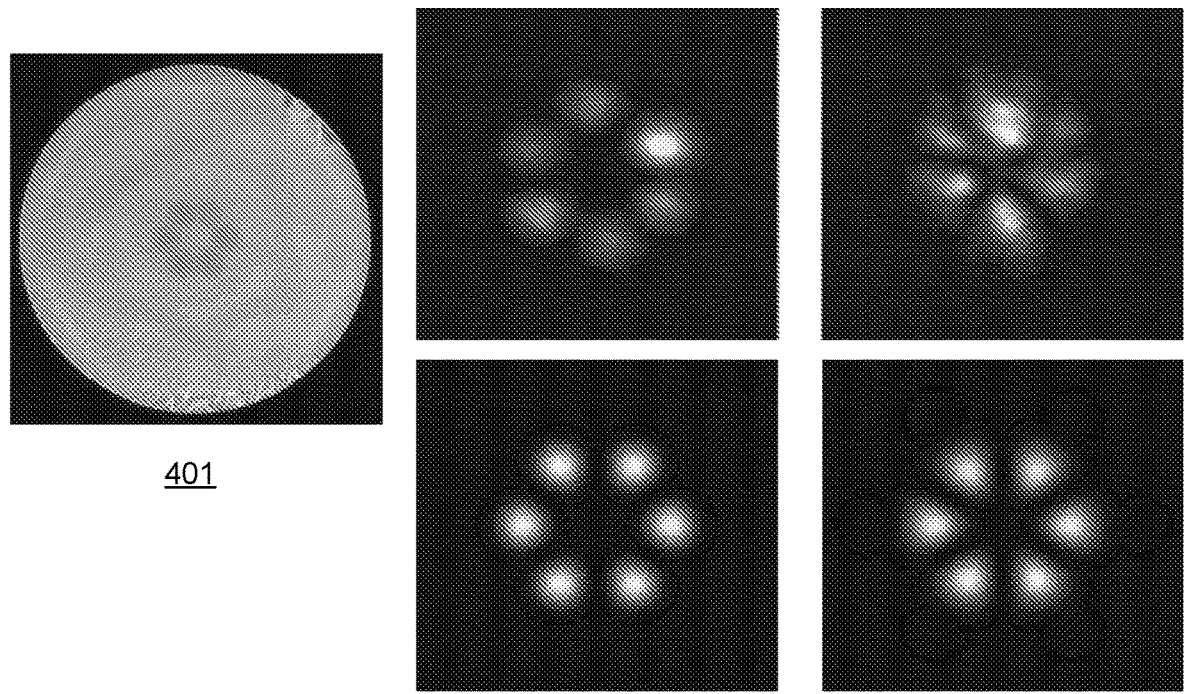
FIG. 8 is an example of an end face image of an experimental MCF, experimental near field and far field profiles, and a laser spectrum.

FIG. 8 is an example of an end face image 401 of an experimental MCF, experimental near field profiles 402, experimental far field profiles 403, and a laser spectrum 404. Above the laser threshold, the beam exhibits distinct separated lobes along the path which confirms phase locking and single out-of-phase super-mode operation in the 6-core MCF.

FIG. 8 illustrates that above the laser threshold, the beam exhibits distinct separated lobes along the path which confirms phase locking and single out-of-phase super-mode operation in the 6-core MCF.

Figure 9:
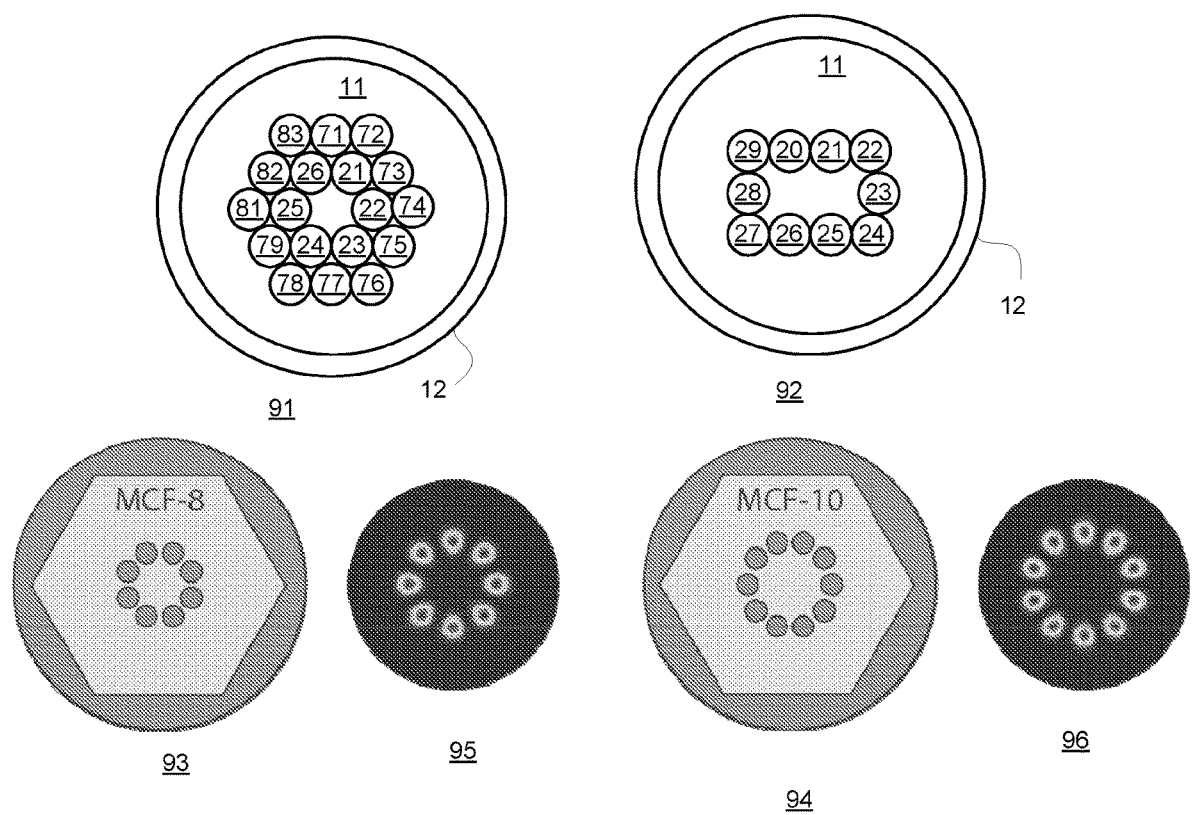
FIG. 9 is an example of MCFs with doped cores.

FIG. 9 illustrates examples of MCFs with doped cores. MCF 91 includes eighteen doped cores (21-26, 71-79 and 81-83) that are arranged in two annular subregions. MCF 92 includes ten doped cores 20-29 arranged in a rectangle. MCF 93 includes eight doped cores that are arranged in a singular annular subregion. MCF 94 includes ten doped cores that are arranged in a singular annular subregion. Images 95 and 96 illustrates optical signals of MCF 93 and MCF 94 respectively.

Any other annular arrangements and/or even number of doped cores are available.

FIG. 10 illustrates an example of a method 500 for selecting a super-mode within an optical unit.

Method 500 may start by step 510 of propagating optical signals within a multicore fiber (MCF) that includes one or more claddings, and multiple doped fiber cores located within one of the one or more claddings. The optical signals include in-phase super-mode components and out-of-phase super-mode components.

Step 510 may be followed by step 520 of attenuating the out-of-phase super-mode components by providing the optical signals to a multimode fiber (MMF) that is directly coupled to the MCF.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A super-mode selective optical unit comprising:
    a multicore fiber (MCF) that comprises one or more claddings, and multiple doped fiber cores located within one of the one or more claddings; and
    a multimode fiber (MMF) that comprises a first MMF end, a second MMF end, an MMF core and a MMF cladding that surround the core; wherein the first MMF end is configured to receive optical signals from the MCF; wherein the MMF is configured to (a) attenuate in-phase super-mode components of the optical signals of the MCF by having the second MMF end located in proximity to a location of a destructive interference of the in-phase super-mode components of the optical signals of the MCF, and (b) retain out-of-phase components of the optical signals.

2. The super-mode selective optical unit according to claim 1 wherein a self-coupling coefficient between the MCF and the MMF are maintained within the MMF by matching a field distribution of the out-of-phase components of the optical signals to single spatial mode of the MMF.

3. The super-mode selective optical unit according to claim 1 wherein the one or more claddings comprise an inner cladding and an outer cladding that surrounds the inner cladding; wherein the multiple doped fiber cores are located within the inner cladding.

4. The super-mode selective optical unit according to claim 1 wherein the MCF has a first MCF end that is directly connected to the first MMF end.

5. The super-mode selective optical unit according to claim 4 wherein each one of the multiple doped fiber cores has an end that is directly connected to the first MMF end.

6. The super-mode selective optical unit according to claim 1 wherein the second MMF end is directly connected to a reflecting mirror.

7. The super-mode selective optical unit according to claim 1 wherein a reflecting mirror is formed at the second MMF.

8. The super-mode selective optical unit according to claim 1 wherein the second MMF end is directly connected to volume Bragg grating (VBG).

9. The super-mode selective optical unit according to claim 1 wherein a Fiber Bragg grating (FBG) is formed in the MMF.

10. The super-mode selective optical unit according to claim 1 wherein the multiple doped fiber cores are arranged in a radially symmetric manner.

11. The super-mode selective optical unit according to claim 1 wherein the multiple doped fiber cores are arranged in a single annular region.

12. The super-mode selective optical unit according to claim 1 wherein the multiple doped fiber cores are arranged in multiple concentric annular regions.

13. The super-mode selective optical unit according to claim 1 wherein the multiple doped fiber cores comprise six doped fiber cores.

14. The super-mode selective optical unit according to claim 1 wherein the MCF is a first MCF, the MMF is a first MMF; wherein the super-mode selective optical unit further comprises a second MCF, the second MCF comprises second one or more claddings, and second multiple doped fiber cores located within one of the one or more second claddings; wherein the second MMF end is configured to provide optical signals to the second MCF.

15. The super-mode selective optical unit according to claim 14 comprising a second MMF; wherein the second MMF comprises a third MMF end and a fourth MMF end; wherein the third MMF end is configured to receive optical signals from the second MCF; wherein the second MMF is configured to attenuate in-phase super-mode components of the optical signals of the second MCF and to amplify out-of-phase components of the optical signals.

16. An optical unit, comprising:
    a fiber that comprises a super-mode selective optical unit; and
    an output combiner;
    wherein the super-mode selective optical unit comprises (i) a multicore fiber (MCF) that comprises one or more claddings, and multiple doped fiber cores located within one of the one or more claddings, and (ii) a multimode fiber (MMF) that comprises a first MMF end, a second MMF end, an MMF core and a MMF cladding that surround the core;
    wherein the first MMF end is configured to receive optical signals from the MCF;
    wherein the MMF is configured to (a) attenuate in-phase super-mode components of the optical signals of the MCF by having the second MMF end located in proximity to a location of a destructive interference of the in-phase super-mode components of the optical signals of the MCF, and to (b) retain out-of-phase components of the optical signals.

17. A method for selecting a super-mode within an optical unit, the method comprises:
    propagating optical signals within a multicore fiber (MCF) that comprises one or more claddings, and multiple doped fiber cores located within one of the one or more claddings; wherein the optical signals comprise in-phase super-mode components and out-of-phase super-mode components; and
    attenuating the out-of-phase super-mode components by providing the optical signals to a multimode fiber (MMF) that is directly coupled to the MCF, the MMF comprises a first MMF end, a second MMF end, an MMF core and a MMF cladding that surround the core, the MMF has the second MMF end located in proximity to a location of a destructive interference of the in-phase super-mode components of the optical signals of the MCF.

* * * * *